Reissued Aug. 1, 1933 Re. 18,907

UNITED STATES PATENT OFFICE 18,907

TRICALCIUM PHOSPHATE AND ALUMINUM PHOSPHATE COMPOSITION SALT FILLER

William George Warning and Theodore William Schilb, St. Louis, Mo., assignors to Swann Research, Inc., a Corporation of Alabama No Drawing. Original No. 1,865,733, dated July 5, 1932, Serial No. 390,208, September 3, 1929. Application for reissue April 15, 1933. Serial No. 666,322

10 Claims. (Cl. 23—243.)

This invention relates to tri-calcium phosphate and more particularly to an improved tri-calcium phosphate more suitable as a filler for preventing caking in salt and similar substances than the tri-calcium phosphate heretofore manufactured.

In the preparation of common salt for table use and for use in self rising flour it is the usual practice to introduce a filler to reduce the tendency of the salt to cake. Caking is very objectionable in a product intended for these purposes. The fillers which have found extensive use are:—sodium bicarbonate, magnesium carbonate, dicalcium phosphate and tri-calcium phosphate. From 0.5% to 1.5% of these substances are incorporated in fine salt producing a product which is relatively free flowing and subject to storage without caking as compared with the untreated salt. Magnesium carbonate and tri-calcium phosphate are more generally used. These substances may also be applied to other crystalline or granular products where a reduction in a tendency to cake is desired.

This invention has as an object a new composition of matter superior in caking inhibiting properties to those now in common use. A further object is an improvement in tri-calcium phosphate which renders it more effective in inhibiting caking in crystalline or granular substances.

These objects are accomplished by the following invention which sets forth a composition of matter consisting of tri-calcium phosphate and aluminum phosphate. It is common knowledge that when milk of lime is precipitated with phosphoric acid the precipitate is more basic than normal tri-calcium phosphate ($3CaO.P_2O_5$). A compound corresponding to the formula $$3Ca_3(PO_4)_2.Ca(OH)_2$$

has been shown to exist and even more basic compositions may be indicated by analysis on account of adsorbed lime. In the description of this invention, therefore, we do not intend to limit ourselves by the use of the term tri-calcium phosphate to the definite compound $3CaO.P_2O_5$ but desire it to be understood that this term is used to include phosphates of lime having a molecular ratio of 3 or more molecules of CaO to one molecule of $P_2O_5$.

We have found that for inhibiting caking in salt, tri-calcium phosphate may be materially improved if it contains 4% to 20% aluminum phosphate ($AlPO_4$), a preferred amount being 7%. The aluminum phosphate may be incorporated in the tri-calcium phosphate in any convenient manner which may readily suggest itself to those versed in the art of chemical manufacture.

As an illustration of how tri-calcium phosphate containing an effective quantity of aluminum phosphate may be advantageously produced, we described in detail the following procedure:

We take 405 pounds of phosphorus pentoxide ($P_2O_5$) as phosphoric acid diluted to 22° Baumé. 16 pounds granular metallic aluminum or 47 lbs. purified bauxite are dissolved in a portion of this acid, equivalent to 168 pounds $P_2O_5$. The resulting acid solution of aluminum phosphate ($AlPO_4$) is filtered free of insoluble material and mixed with the remainder of the original batch of acid. The combined acid mixture is fed with agitation into a milk of lime containing 437 pounds calcium oxide (CaO) at a concentration of approximately 105 grams CaO per liter. The addition of the acid mixture is continued until a 10 cc. sample of the slurry requires 2 cc. of 0.1 N alkali to bring to alkaline penolphthalein end point. Stirring is continued two hours to complete the reaction and then the slurry may be filtered and dried in the conventional manner or it may be dried by atomizing in a current of warm air. The dried product which still contains 10% to 15% water as determined by ignition loss must then be ground to reduce the particles to a sufficient degree of fineness (1 to 4 microns). We have found an attrition mill to be a suitable type for this reduction.

A typical analysis of the product produced by this procedure is as follows:

| | Per cent |
|---|---|
| CaO | 44.4 |
| $P_2O_5$ | 38.1 |
| $AlPO_4$ | 7.12 |

We have found that other metallic phosphates such as iron may also be used to enhance the caking inhibiting properties of tri-calcium phosphate but due to the fact that they impart objectionable colors to the finished product they are undesirable for this purpose.

Finely ground tri-calcium phosphate containing 4% to 20% aluminum phosphate may be advantageously mixed to the extent of 1% with fine table salt or salt prepared for self rising flour manufacture to prevent caking. It may also be used with other crystalline or granular materials such as mono-calcium phosphate to reduce a tendency toward caking.

As an illustration of the effectiveness of our invention over materials heretofore used we describe the following test:—We incorporated by mechanical mixing 1% of each the caking inhibiting substances in salt and expose the prepared samples in shallow dishes to the atmosphere above a saturated salt (NaCl) solution at 100° F. for 2 hours and then removed the samples and dried them in an oven at 100° F. for 30 minutes. The comparative degree of caking in the samples of salt was determined and it was found that the specially prepared tri-calcium phosphate containtaining 7% aluminum phosphate ranked first as a caking inhibitor with magnesium carbonate second, ordinary tri-calcium phosphate third, sodium bicarbonate fourth and di-calcium phosphate fifth.

It is known that aluminum phosphate is present to a limited extent in tri-calcium phosphate as ordinarily manufactured being included as an unavoidable impurity in the phosphoric acid but the quantities usually present (0.2% to 2.0%) are not sufficient to accomplish the improvement in caking inhibiting properties gained by our invention.

Having described the properties of our invention, its application, and a convenient method of manufacture, what we claim as new and novel is:

1. A dry salt containing a filler consisting of tri-calcium phosphate with aluminum phosphate in excess of 4%, the amount of said filler in said salt being sufficient to prevent caking and not in excess of 1% of the salt.

2. Dry sodium chloride containing approximately 1% of a filler consisting of tri-calcium phosphate and 4% to 20% aluminum phosphate.

3. Dry sodium chloride containing substantially 1% of a caking inhibitor consisting essentially of tri-calcium phosphate containing approximately 7% aluminum phosphate.

4. Dry sodium chloride containing sufficient caking inhibitor to prevent caking, said inhibitor consisting of finely ground tri-calcium phosphate with aluminum phosphate in excess of 4%.

5. A dry salt containing sufficient filler to prevent caking, said filler consisting of finely ground tri-calcium phosphate with 4% to 20% aluminum phosphate.

6. A dry salt containing sufficient caking inhibitor to prevent caking, said inhibitor consisting of finely ground tri-calcium phosphate containing 7% aluminum phosphate.

7. A dry crystalline or granular substance having a tendency to cake in storage and containing sufficient filler to prevent caking, said filler comprising tri-calcium phosphate and aluminum phosphate, the amount of tri-calcium phosphate being from five to twenty-five times that of aluminum phosphate.

8. A crystalline substance having a tendency to cake in storage and containing a filler comprising tri-calcium phosphate with from 4% to 20% of aluminum phosphate, the amount of said filler being sufficient to prevent caking and not in excess of 1% of the substance.

9. A granular substance which by itself tends to cake in storage and containing a caking inhibitor comprising tri-calcium phosphate with from 4% to 20% of aluminum phosphate, the amount of said inhibitor being sufficient to prevent caking and not in excess of 1% of the substance.

10. A crystalline or granular substance which by itself tends to cake in storage, and containing sufficient filler to prevent caking, said filler comprising tri-calcium phosphate with approximately 7% of aluminum phosphate incorporated therein.

WILLIAM GEORGE WARNING.
THEODORE WILLIAM SCHILB.